United States Patent [19]

Browne

[11] Patent Number: 4,930,538

[45] Date of Patent: Jun. 5, 1990

[54] COMPACT MANIFOLD VALVE

[75] Inventor: Ronnie Browne, Derry, N.H.

[73] Assignee: Memron, Inc., Amherst, N.H.

[21] Appl. No.: 298,106

[22] Filed: Jan. 17, 1989

[51] Int. Cl.[5] .............................................. F16K 27/00

[52] U.S. Cl. ...................................... 137/269; 137/606

[58] Field of Search ...................... 137/606, 269, 269.5, 137/270, 271, 884

[56] References Cited

U.S. PATENT DOCUMENTS

| | | | |
|---|---|---|---|
| 3,491,789 | 1/1970 | Callahan, Jr. et al. | 251/335.1 X |
| 3,509,904 | 5/1970 | Olson | 137/269 |
| 3,890,997 | 6/1975 | Dresler | 137/271 |
| 4,082,108 | 4/1978 | Dininio | 137/269.5 |
| 4,168,724 | 9/1979 | Graffunder et al. | 137/884 X |
| 4,610,270 | 9/1986 | Acker | 137/549 |
| 4,714,091 | 12/1987 | Wagner | 137/884 |
| 4,741,354 | 5/1988 | DeMild, Jr. . | |

OTHER PUBLICATIONS

Vacuum Chemical Vapor Deposition V-CVD Brochure on Wafer Fab. Products from Bruce Systems, 5/1983.

Ohmi, T. et al., Super Clean Room System-Ultra Clean Technology for Submicron LSI Fabrication, Technical Papers on Ultra Clean Tech. Dept. of Electronics, Univ. Sendai 980, Japan, First Intern. Sympo. Phil. PA 5/14/87.

*Primary Examiner*—John C. Fox

*Attorney, Agent, or Firm*—Weingarten, Schurgin, Gagnebin & Hayes

[57] ABSTRACT

A compact manifold valve for use in gas flow systems includes a manifold body, first and second cartridge holders, first and second operating valves and an outlet port. The manifold body includes valve turrets for mounting the first and second operating valves. Different valves types such as externally pressurized, normally closed bellows or diaphragm valves, externally pressurized, normally open bellows or diaphragm valves, double acting bellows or diaphragm valves, manually operated valves and/or toggle operated valves may be readily interchanged in the manifold valve to accommodate different applications in the gas flow system. The manifold body also includes first and second valve chambers, first and second cartridge ports, and multiple fluid flow pathways fluidically interconnecting the valve chambers, cartridge ports and outlet port. The manifold valve further includes first and second cartridge holders which are configured to be readily mounted in and removed from the manifold body. The cartridge holders are configured for internal seating of filter and/or check valve cartridges depending upon the particular application. The check valve cartridge is configured for reversible seating within the cartridge holder so that, depending upon the particular application, fluid backflow into or out of the manifold valve may be precluded.

11 Claims, 3 Drawing Sheets

COMPACT MANIFOLD VALVE

FIELD OF THE INVENTION

The present invention relates generally to gas flow systems, and more particularly to a compact manifold valve which may be readily integrated into any gas flow system and which may be readily reconfigured for a variety of applications.

BACKGROUND OF THE INVENTION

Industrial gas flow systems are typically complex systems requiring a multiplicity of mechanical connections between many and varied fixtures and plumbing. The complexity of these gas flow systems is reflected in the industry jargon describing these systems, "gas jungles". Prior art gas jungles have a number of inherent limitations and disadvantages.

The multiplicity of mechanical connections required in such systems reduces the overall reliability of such systems. The complexity of the configuration increases particulate generation and provides more particulate entrapment zones. The multiplicity of mechanical connections, moreover, increases the costs associated with such systems in labor required to fit connections, auto weld joints and provide tubing bends.

In addition, integrity maintenance such as leak detection and/or control for such systems is a cumbersome and time consuming procedure. The integrity of the multiplicity of mechanical connections is a more critical factor where the gas jungle experiences acute extremes in temperature as in those gas flow systems subjected to heating and/or cooling to vaporize and/or condense fluids flowing therethrough. The multiplicity of fixtures and the complexity of the interconnecting plumbing configuration, moreover, limits access to the components of the system for maintenance and/or repair.

The mechanical complexity of gas jungles for industrial applications such as vacuum chemical vapor deposition (V-CVD) systems presents matters of additional concern. V-CVD systems utilize volatile and/or toxic gases to grow thin films such as polysilicon, silicon nitrides, high and low temperature silicon dioxide, tetraethoxy silane and phosphosilicate glass on silicon wafer substrates. Loss of mechanical integrity in such systems may have adverse or disastrous consequences.

There are additional configuration or functional constraints associated with prior art gas jungles. The plumbing configurations of some prior art gas jungles do not positively isolate flow streams of diverse gases. Certain elements of the gas jungle such as check valves and filters are independent elements requiring additional time and mechanical connections for integration into the jungle.

Prior art switching valves are preconfigured for a particular application and must be removed from the system and reconfigured for different applications. In addition, some gas flow systems require that the switching valve be positioned at the same elevation as the mass flow controller.

SUMMARY OF THE INVENTION

To overcome the inherent disadvantages and limitations of prior art gas flow systems, a compact manifold valve is provided which is readily integrated into existing gas flow systems with fewer fittings such as T's, elbows and connections and less gas flow system tubing and bending thereof, thereby increasing the reliability and integrity of the system as well as enhancing the manageability of leak detection and/or control and reducing the number of entrapment zones within the system. The compact configuration of the manifold valve facilitates access to the system for maintenance and/or repair as well as reducing the stack height of the gas jungle.

The manifold valve of the present invention has greater utility and versatility in gas flow systems since it may be reconfigured for operation in a variety of different applications. The manifold valve provides positive isolation between incoming flow streams and generates minimal particulates during operation cycles.

The compact manifold valve of the present invention includes a manifold body, first and second cartridge holders, first and second operating valves, and an outlet port. The manifold body includes first and second threaded valve turrets depending therefrom and corresponding contiguous valve chambers for mounting the operating valves. Different valve types or combinations thereof such as externally pressurized, normally closed bellows or diaphragm valves, externally pressurized, normally open bellows or diaphragm valves, double acting bellows or diaphragm valves, manually operated valves and/or toggle valves may be interchangeably mounted to the manifold body to accommodate operating changes in the gas flow system, thereby enhancing the utility and versatility of the manifold valve.

The manifold body also includes first and second cartridge ports which may function as gas flow inlet ports. The manifold valve further includes multiple internal fluid flow pathways which fluidically interconnect each cartridge port to a corresponding valve chamber and each valve chamber to the outlet port. The multiple fluid flow pathways reduce the number of bends required in the gas flow system tubing. Internal fluid flow through the multiple fluid flow pathways is controlled by the operating valves. The multiple fluid flow pathways in combination with the operating valves provide positive isolation between fluid flowing through the manifold valve.

The first and second cartridge holders are configured for easy mounting in and removal from corresponding cartridge ports in the manifold body, thereby enhancing the utility and versatility of the manifold valve. A sealing means is provided so that the cartridge holders may be mounted in the manifold body in sealed relation thereto. The cartridge holders are further configured to internally seat filter cartridges and/or check valve cartridges to further enhance the utility and versatility of the manifold valve.

The filter cartridge includes a biasing spring, a filter element and a gasket. The filter cartridge is configured for seating within the cartridge holder in sealed relationship thereto.

The check valve cartridge includes a biasing spring and a check poppet. The check poppet includes a sealing means and ports for one way fluid flow through the check valve cartridge. The check valve cartridge is reversibly seatable within the cartridge holder so that in a first orientation the sealing means coacts with a wall of the cartridge port while in the second orientation the sealing means coacts with the cartridge holder.

BRIEF DESCRIPTION OF THE DRAWINGS

A more complete understanding of the present invention and the attendant advantages and features thereof will be more readily understood by reference to the following detailed description when considered in conjunction with the accompanying drawings wherein.

DETAILED DESCRIPTION OF PREFERRED EMBODIMENTS

Figure 1:
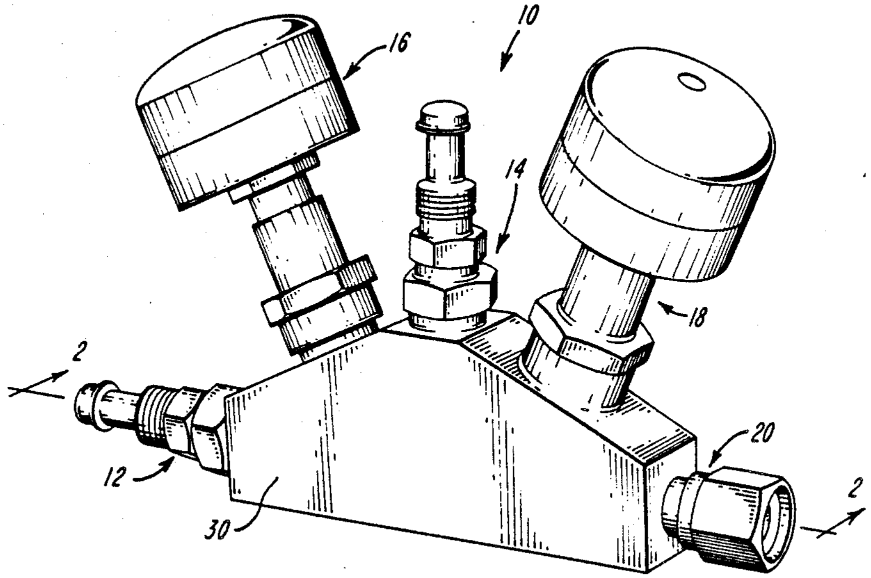
FIG. 1 is a perspective view of a manifold valve according to the present invention.

Referring now to the drawings wherein like reference numerals designate corresponding or similar elements throughout the several views, an exemplary manifold valve 10 according to the present invention for use in a gas flow system is depicted in FIG. 1. The manifold valve 10 includes a manifold body 30, a first cartridge holder 12, a second cartridge holder 14, first and second operating valves 16, 18 and an outlet port 20.

The first and second operating valves 16, 18 exemplarily illustrated in FIG. 1 are externally pressurized, normally closed bellows valves. Due to the configuration of the manifold body 30, different valve types may be readily interchanged in the manifold valve 10 to accommodate operating changes in the gas flow system, thereby enhancing the flexibility and utility of the manifold valve 10. For example, the first and second valves may be externally pressurized, normally closed diaphragm valves, externally pressurized, normally open bellows or diaphragm valves, double acting bellows or diaphragm valves, manually operated valves and/or toggle operated valves.

Figure 2:
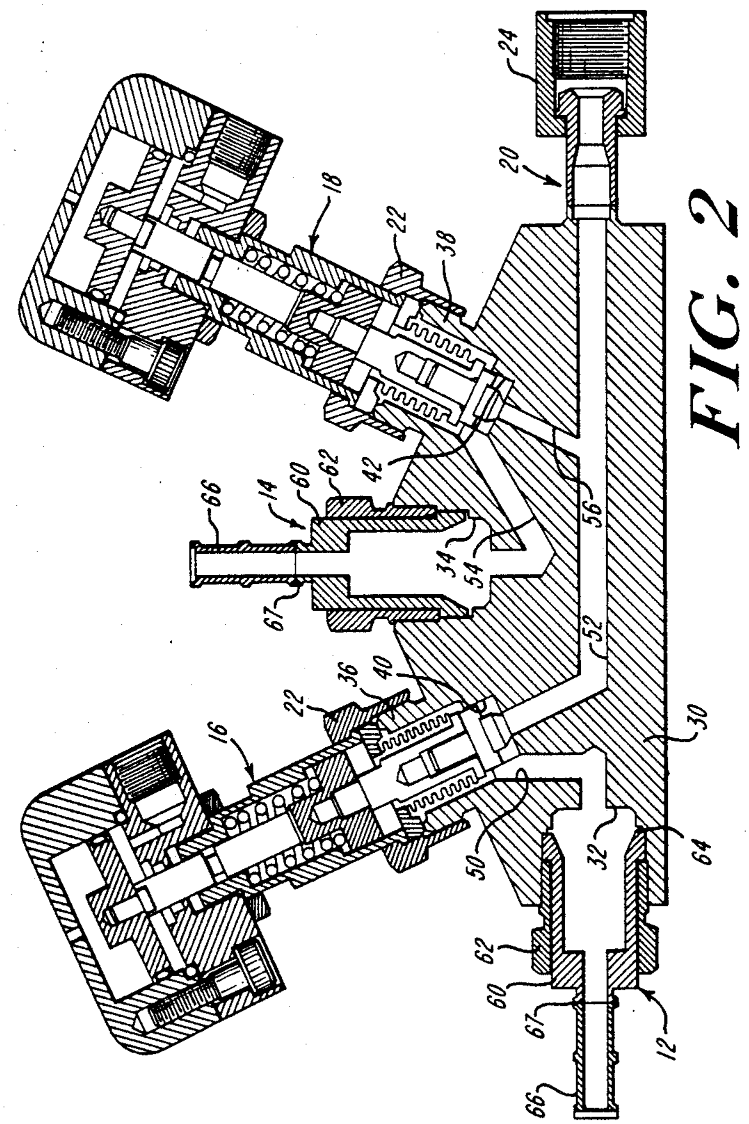
FIG. 2 is a cross-sectional view of the manifold valve of FIG. 1 taken along line 2—2 thereof.

The manifold body 30 illustrated in FIG. 2 includes first and second cartridge ports 32, 34 which are internally threaded to receive the first and second cartridge holders 12, 14, respectively. The manifold body 30 also includes first and second annular valve turrets 36, 38 which are externally threaded to facilitate mounting of the first and second operating valves 16, 18 thereto by means of hex nuts 22. The first and second valve turrets 36, 38 in combination with the manifold body 30 define first and second valve chambers 40, 42, respectively, for seating the first and second operating valves 16, 18.

The manifold body 30 also includes internal fluid flow pathways interconnecting the first and second operating valves 16, 18, the first and second cartridge ports 32, 34 and the outlet port 20. By providing internally formed fluid flow pathways, fewer fittings such as T's, elbows and connections, and less bending of gas flow system tubing, are required to incorporate the manifold valve 10 into any particular gas flow system.

The fluid flow pathways include a first fluid flow pathway 50 fluidically coupling the first cartridge port 32 to the first valve chamber 40, a second fluid flow pathway 52 fluidically coupling the first valve chamber 40 to the outlet port 20, a third fluid flow pathway 54 fluidically coupling the second cartridge port 34 to the second valve chamber 42 and a fourth fluid flow pathway 56 fluidically coupling the second valve chamber 42 to outlet port 20 via the second fluid flow pathway 52. The fluid flow pathways are coupled to the external gas flow system by means of tubing connected to the first and second cartridge holders 12, 14 and the outlet port 20. The outlet port connection may include a hex nut 24. The internal fluid flow pathways reduce the number of connections required to couple the manifold valve into the gas flow system, thereby enhancing reliability.

Figure 3:
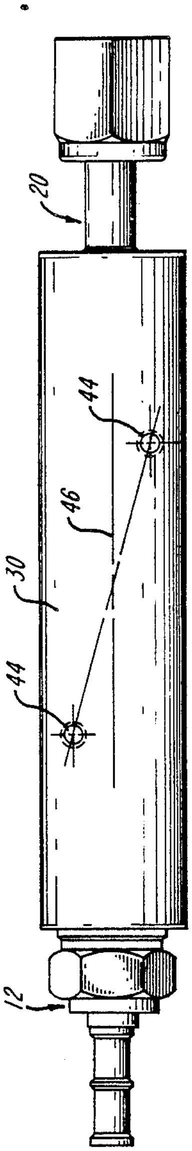
FIG. 3 is a bottom plan view of the manifold valve of FIG. 1.

Referring to FIG. 3, the manifold body 30 may include mounting bores 44, illustrated as offset from the centerline 46 of the manifold body, to facilitate mounting of the manifold valve 10 in the gas flow system. The manifold body 30 may be fabricated from a noncorrosive material such as stainless steel.

In one preferred embodiment, the manifold body 30 has a length (first cartridge port to outlet port) of about 4.5 inches and a width of about 0.985 inches. The manifold valve 10 has an overall length (external end of cartridge holder to external end of outlet port) of about 6.765 inches and an overall stack height (bottom of manifold body to topmost portion of operating valve) of about 4.41 inches. The compact configuration of the manifold valve facilitates installation in the gas flow system, access for maintenance and/or repair, and greater manageability for leak detection and/or control.

As shown in FIG. 2, each cartridge holder 12, 14 includes a gland 60 and a threaded nut 62. The gland 60 is configured to be mounted within the corresponding cartridge port 32, 34 of the manifold body 30. An O-ring 64, which may be silver plated, is disposed intermediate the end of the gland 60 and the port wall. The nut 62 is configured to engage the gland 60 and is externally threaded to coact with the threads of the corresponding cartridge port 32, 34 to mount the cartridge holders 12, 14 within the manifold body 30.

The cartridge holders 12, 14 may include a tubular projection 66 depending from the external end of the gland 60. The tubular projection 66 may be joined to the gland 60 by a full penetration TIG buttweld. The gland 60, the nut 62, the O-ring 64 and the tubular projection 66 may be formed of a noncorrosive material such as stainless steel.

The cartridge holders 12, 14 are designed to receive a filter cartridge or a check valve cartridge. This aspect of the present invention greatly enhances the utility of the manifold valve 10 by permitting the valve to be readily configured or reconfigured in varying combinations by inserting filter cartridges and/or check valve cartridges in corresponding cartridge holders 12, 14.

Figure 4:
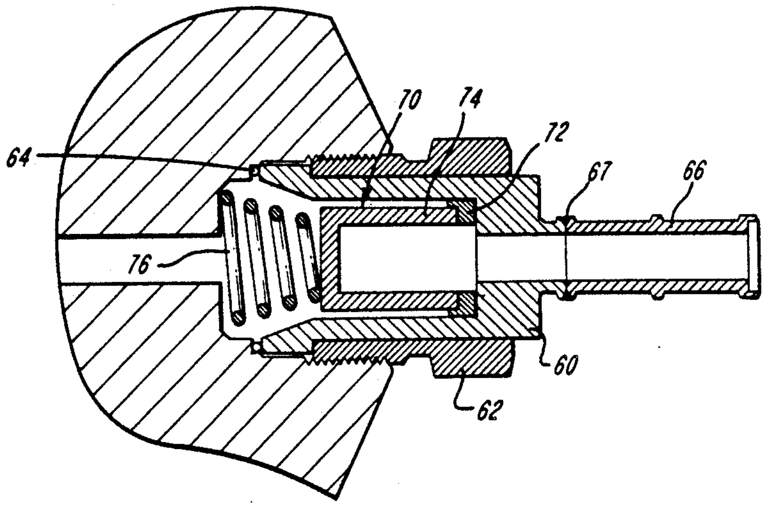
FIG. 4 is a partial cross-sectional view showing a filter cartridge in combination with a cartridge holder mounted in the body of the manifold valve.

An exemplary filter cartridge 70, seated within a cartridge holder mounted in the manifold body 30, is illustrated in FIG. 4 and includes a gasket 72, a filter element 74 and a biasing spring 76. The gasket 72 is configured for internal seating within the gland 60, and the gland 60 compressingly coacts against the gasket 72 to form a leak-free seal. The filter element 74 is configured for seating against the gasket 72. The biasing spring 76 is configured to abuttingly engage the internal end of the filter element 74 and the internal end wall of the corresponding cartridge port 32, 34, thereby maintaining the seated condition of the gasket 72 and the filter element 74.

The gasket 72 may be formed from a sealing material such as teflon. The biasing spring 76 and the filter element 74 may be formed from a noncorrosive material such as stainless steel.

Depending upon the operating conditions of the particular gas flow system, the filter element 74 may be formed. to have predetermined nominal porosity ratings of 0.5, 1.0, 5.0 or 10.0 microns. By way of example only, filter elements 74 having nominal porosity ratings of 0.5, 1.0, 5.0 or 10.0 microns will provide corresponding $C_V$s of about 0.0007, 0.020, 0.047 or 0.095.

Figure 5:
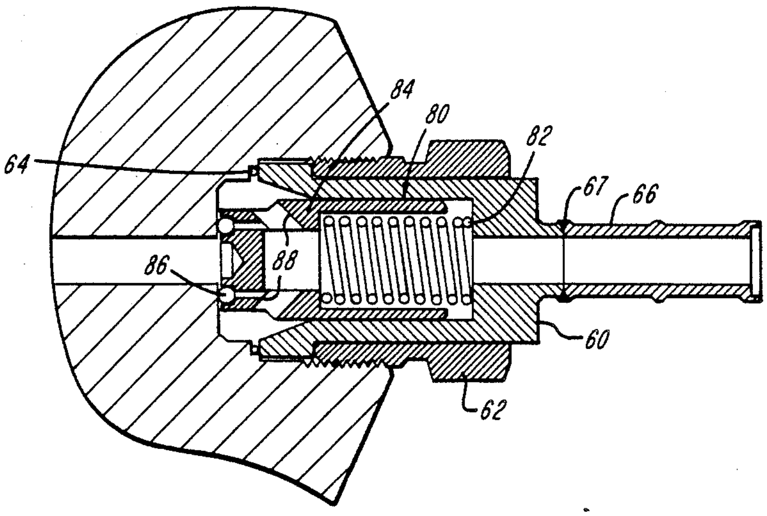
FIG. 5 is a partial cross-sectional view showing a check valve cartridge in combination with a cartridge holder mounted in the body of the manifold valve.

An exemplary check valve cartridge 80, seated within a cartridge holder mounted in the manifold body 30, is illustrated in FIG. 5 and includes a biasing spring 82 and a check poppet 84. The check poppet 84 is an open-ended cylindrical configuration so that the the biasing spring 82 may be mounted therein. The closed end of the check poppet 84 is configured so that a cartridge O-ring 86 may be seated therein. Multiple fluid flow ports 88 are formed through the wall of the check poppet 84 adjacent the closed end thereof to provide one way fluid flow through the check valve cartridge 80. The biasing spring 82 and the check poppet 84 may be formed of a noncorrosive material such as stainless steel and the cartridge O-ring 86 may be formed of a sealing material such as viton, buna-n, kalrez, silicone or fluorosilicone.

A unique aspect of the check valve cartridge 80 of the present invention is that the cartridge is reversibly seatable within the cartridge holder to provide the option of checking fluid flow in one of two directions, depending upon the particular application. In the seating configuration of FIG. 5, the biasing spring 82 abuts the gland 60 and the check poppet 84 to bias the closed end of the check poppet 84 against the internal end wall of the corresponding cartridge port 32, 34, thereby precluding fluid backflow from the gas flow system into the manifold valve 10. In this seating configuration, the check valve cartridge 80 provides a $C_V$ of about 0.25.

In the opposite seating configuration, the biasing spring 82 abuts the internal end wall of the corresponding cartridge port 32, 34 and the check poppet 84 to bias the closed end of the check poppet 84 against the gland 60. This seating configuration provides a $C_V$ of about 0.16 and prevents fluid backflow from the manifold valve 10 into the gas flow system.

The manifold valve 10 of the present invention is designed for operating pressures in the range of about 200 psig to vacuum at 70° F. The manifold valve 10 has a temperature rating for operations at about −150° F. to about 300° F. The valve has been helium leak tested to about $4\times10^{-9}$ std.atm. CC/sec.

A variety of modifications and variations of the present invention are possible in light of the above teachings. It is therefore to be understood that within the scope of the appended claims, the present invention may be practiced otherwise than as specifically described hereinabove.

What is claimed is:

1. A manifold valve for use in a gas flow system, comprising:

manifold body means configured for coupling into the gas flow system for controlling fluid flow therethrough, said manifold body means having a plurality of fluid flow pathways formed internally therein;

operating valve means coupled to said manifold body means for controlling fluid flow through said plurality of fluid flow pathways of said manifold body means; and means removably coupled to said manifold body means for interacting with the fluid flow through said plurality of fluid flow pathways of said manifold body means, said fluid flow interacting means including cartridge means configured for interacting with the fluid flow through said manifold body means, said cartridge means including filter cartridge means for filtering particulates from the fluid flow therethrough and check valve cartridge means for precluding fluid backflow in a predetermined direction with respect to said manifold body means, and cartridge holder means having a configuration for interchangeable, internal seating of said filter cartridge means and said check valve means in sealed combination therein, said cartridge holder means being further configured for removable coupling in sealed combination with said manifold body means;

said manifold body means including cartridge port means for removably coupling said cartridge holder means having at least one of said filter cartridge means and said check valve cartridge means internally seated in sealed combination therein in sealed combination with said manifold body means for controlling fluid flow through said manifold valve.

2. The manifold valve of claim 1 wherein said cartridge holder means comprises at least one cartridge holder configured for removable coupling by threading action with said cartridge port means of said manifold body means such that said at least one of said filter cartridge means and said check valve means internally seated therein interacts with the fluid flow through one of said plurality of fluid flow pathways of said manifold body means.

3. The manifold valve of claim 2 wherein said filter cartridge means is seated internally within said at least one cartridge holder to interact with the fluid flow through said one of said plurality of fluid flow pathways to filter particulates from the fluid flow.

4. The manifold valve of claim 2 wherein said check valve cartridge means is reversibly seatable internally within said at least one cartridge holder to interact with the fluid flow through said one of said plurality of fluid flow pathways to preclude fluid backflow in said predetermined direction with respect to said manifold body means.

5. The manifold valve of claim 4 wherein said check valve cartridge means is seated internally within said at least one cartridge holder in a first orientation to interact with the fluid flow through said one of said plurality of fluid flow pathways to preclude fluid backflow into said manifold body means.

6. The manifold valve of claim 4 wherein said check valve cartridge means is seated internally within said at least one cartridge holder in a second orientation to interact with the fluid flow through said one of said plurality of fluid flow pathways to preclude fluid backflow out of said manifold body means.

7. The manifold valve of claim 1 wherein said manifold body means includes means for coupling said operating valve means to said manifold body means, said coupling means including first and second externally threaded turrets depending outwardly from said manifold body means and first and second valve chambers defining corresponding valve seats formed internally in said manifold body means contiguous with said first and second externally threaded turrets, respectively;

said cartridge port means for removably coupling said cartridge means to said manifold body means includes first and second internally threaded cartridge ports; and outlet port means for fluidically coupling said manifold body means to the gas flow system; and wherein said plurality of fluid flow pathways fluidically interconnect said first and second valve chambers, said first and second internally threaded cartridge ports and said outlet port means.

8. The manifold valve of claim 7 wherein said plurality of fluid flow pathways include a first fluid flow pathway fluidically interconnecting said first cartridge port to said first valve chamber;

a second fluid flow pathway fluidically interconnecting said first valve chamber to said outlet port means;

a third fluid flow pathway fluidically interconnecting said second cartridge port to said second valve chamber; and a fourth fluid flow pathway fluidically interconnecting said second valve chamber to said outlet port means.

9. The manifold valve of claim 8 wherein said cartridge holder means comprises first and second cartridge holders configured for removable coupling within said first and second internally threaded cartridge ports, respectively, each said first and second cartridge holders including a gland configured to be slidably received in a respective one of said first and second internally threaded cartridge ports to interact with the fluid flow through a respective one of said first and third fluid flow pathways, an externally threaded nut configured for mating in said respective one of said first and second internally threaded cartridge ports, said externally threaded nut being further configured to interface with the outer surface of said gland to lock said gland within said respective one of said first and second internally threaded cartridge ports, and sealing means disposed intermediate said gland and said respective one of said first and second internally threaded cartridge ports for forming a seal therebetween.

10. A manifold valve for use in a gas flow system, comprising:

manifold body means configured for coupling into the gas flow system for controlling fluid flow therethrough, said manifold body means having a plurality of fluid flow pathways formed internally therein and outlet port means for fluidically coupling said manifold body means to the gas flow system;

operating valve means coupled to said manifold body means for controlling fluid flow through said plurality of fluid flow pathways of said manifold body means;

said manifold body means including means for coupling said operating valve means to said manifold body means, said coupling means including first and second externally threaded turrets depending outwardly from said manifold body means and first and second valve chambers defining corresponding valve seats formed internally in said manifold body means contiguous with said first and second externally threaded turrets, respectively; and cartridge means coupled to said manifold body means for interacting with the fluid flow through said plurality of fluid flow pathways of said manifold body means in a predetermined manner;

said manifold body means further including means for coupling said cartridge means to said manifold body means, said coupling means including first and second internally threaded cartridge ports, and wherein said plurality of fluid flow pathways fluidically interconnect said first and second valve chambers, said first and second internally threaded cartridge ports and said outlet port means, said plurality of fluid flow pathways comprising a first fluid flow pathway fluidically interconnecting said first cartridge port to said first valve chamber, a second fluid flow pathway fluidically interconnecting said first valve chamber to said outlet port means, a third fluid flow pathway fluidically interconnecting said second cartridge port to said second valve chamber, and a fourth fluid flow pathway fluidically interconnecting said second valve chamber to said outlet port means;

said cartridge means including first and second cartridge holders configured for coupling within said first and second internally threaded cartridge ports, respectively, each said first and second cartridge holders comprising a gland configured to be slidably received in a respective one of said first and second internally threaded cartridge ports to interact with the fluid flow through a respective one of said first and third fluid flow pathways, an externally threaded nut configured for mating in said respective one of said first and second internally threaded cartridge ports, said externally threaded nut being further configured to interface with the outer surface of said gland to lock said gland within said respective one of said first and second internally threaded cartridge ports, and sealing means disposed intermediate said gland and said respective one of said first and second internally threaded cartridge ports for forming a seal therebetween;

said cartridge means further comprising at least one filter cartridge configured for internal seating within said gland of one of said first and second cartridge holders, said at least one filter cartridge including a gasket configured for internal seating within said gland of one of said first and second cartridge holders, a filter element configured for mounting within said gland of one of said first and second cartridge holder seated against said gasket to interact with the fluid flow through said respective one of said first and third fluid flow pathways to filter particulates from the fluid flow, said filter element being further configured to have a predetermined nominal porosity rating, and a biasing spring disposed to abut said filter element and the end wall of said respective one of said first and second internally threaded cartridge ports.

11. A manifold valve for use in a gas flow system, comprising:

manifold body means configured for coupling into the gas flow system for controlling fluid flow therethrough, said manifold body means having a plurality of fluid flow pathways formed internally therein and outlet port means for fluidically coupling said manifold body means to the gas flow system;

operating valve means coupled to said manifold body means for controlling fluid flow through said plurality of fluid flow pathways of said manifold body means;

said manifold body means including means for coupling said operating valve means to said manifold body means, said coupling means including first and second externally threaded turrets depending outwardly from said manifold body means and first and second valve chambers defining corresponding valve seats formed internally in said manifold body means contiguous with said first and second externally threaded turrets, respectively; and cartridge means coupled to said manifold body means for interacting with the fluid flow through said plurality of fluid flow pathways of said manifold body means in a predetermined manner;

said manifold body means further including means for coupling said cartridge means to said manifold body means, said coupling means including first and second internally threaded cartridge ports, and wherein said plurality of fluid flow pathways fluidically interconnect said first and second valve chambers, said first and second internally threaded cartridge ports and said outlet port means, said plurality of fluid flow pathways comprising a first fluid flow pathway fluidically interconnecting said first cartridge port to said first valve chamber, a second fluid flow pathway fluidically interconnecting said first valve chamber to said outlet port means, a third fluid flow pathway fluidically interconnecting said second cartridge port to said second valve chamber, and a fourth fluid flow pathway fluidically interconnecting said second valve chamber to said outlet port means;

said cartridge means including first and second cartridge holders configured for coupling within said first and second internally threaded cartridge ports, respectively, each said first and second cartridge holders comprising a gland configured to be slidably received in a respective one of said first and second internally threaded cartridge ports to interact with the fluid flow through a respective one of said first and third fluid flow pathways, an externally threaded nut configured for mating in said respective one of said first and second internally threaded cartridge ports, said externally threaded nut being further configured to interface with the outer surface of said gland to lock said gland within said respective one of said first and second internally threaded cartridge ports, and sealing means disposed intermediate said gland and said respective one of said first and second internally threaded cartridge ports for forming a seal therebetween;

said cartridge means further comprising at least one check valve cartridge configured for reversible seating within said gland of one of said first and second cartridge holders, said at least one check valve cartridge including a check poppet configured for internal seating within said gland of one of said first and second cartridge holders to interact with the fluid flow through said respective one of said first and third fluid flow pathways to preclude fluid backflow therethrough, said check poppet including sealing means for forming a seal between said check poppet and the fluid flow through said respective one of said first and third fluid flow pathways, and spring biasing means configured for seating within said check poppet for biasing said check poppet closed to preclude fluid backflow through said respective one of said first and third fluid flow pathways.

* * * * *